United States Patent [19]
Mattin

[11] Patent Number: 4,797,308
[45] Date of Patent: Jan. 10, 1989

[54] SIMULATED MOTHER-OF-PEARL

[75] Inventor: Harry E. Mattin, Briarcliff Manor, N.Y.

[73] Assignee: The Mearl Corporation, Ossining, N.Y.

[21] Appl. No.: 70,051

[22] Filed: Jul. 6, 1987

[51] Int. Cl.⁴ .............................................. B32B 27/20
[52] U.S. Cl. ...................... 428/15; 106/417; 428/363
[58] Field of Search .................. 106/291; 428/15, 363

[56] References Cited

U.S. PATENT DOCUMENTS

| Re. 31,780 | 12/1984 | Cooper et al. | 428/212 |
|---|---|---|---|
| 1,539,084 | 5/1925 | Higgins | 264/158 |
| 1,606,030 | 11/1926 | Higgins | 264/75 X |
| 1,607,622 | 11/1926 | Higgins | 156/61 |
| 1,607,623 | 11/1926 | Higgins | 264/108 |
| 1,607,624 | 11/1926 | Higgins | 264/108 X |
| 3,087,828 | 4/1963 | Linton | 106/291 |
| 3,565,985 | 2/1971 | Schrenk et al. | 264/171 |
| 3,773,882 | 11/1973 | Schrenk | 264/171 |
| 3,801,429 | 4/1974 | Schrenk et al. | 428/392 |
| 4,205,997 | 6/1980 | Hesse et al. | 428/407 X |
| 4,309,480 | 1/1982 | Armanini | 428/403 |
| 4,457,540 | 7/1984 | Hohne | 106/291 X |
| 4,499,143 | 2/1985 | Panush | 106/291 X |
| 4,720,438 | 1/1988 | Watanabe et al. | 428/542.2 X |

Primary Examiner—Henry F. Epstein
Attorney, Agent, or Firm—Ostrolenk, Faber, Gerb & Soffen

[57] ABSTRACT

An iridescent lustrous composite which can simulate the appearance of mother-of-pearl comprises a substrate comprising a transparent or translucent plastic which has been pigmented with a metal oxide coated mica pigment and the substrate carries on at least one of its surfaces a transparent thermoplastic resinous laminate film of at least ten very thin and generally parallel layers of transparent thermoplastic resinous materials, the contiguous layers differing in refractive index by at least about 0.03 and in which the layer at each external surface of the laminate film has a thickness which is greater than the thickness of any one of the multiple very thin layers.

10 Claims, No Drawings

SIMULATED MOTHER-OF-PEARL

BACKGROUND OF THE INVENTION

The distinctive appearance of mother-of-pearl depends on two optical characteristics: pearly luster and iridescence. Pearly or pearlescent luster may be reproduced by the use of nacreous pigments. The earliest such pigment is natural pearl essence, derived from fish scales. More recent nacreous pigments are the metal oxide-coated mica pigments, such as titanium dioxide-coated mica. The second property, iridescence, is a play of colors produced by light interference; certain wavelengths in white light are reinforced while others are suppressed. Certain metal oxide-mica pigments display interference color in addition to pearlescent luster.

Attempts to reproduce the appearance of mother-of-pearl go back many years. Higgins (U.S. Pat. Nos. 1,539,084; 1,606,030; 1,607,623; and 1,607,624) describes the production of pearly celluloid sheets pigmented with fish scale pigment, i.e. natural pearl essence. These sheets have the luster of mother-of-pearl but lack color.

In the U.S. Pat. No. 1,607,622, iridescent color produced from interference by a single thin film of nitrocellulose, polished with a basic halogen salt of bismuth, is combined with the luster of fish scale pigment. The iridescence is very weak, the method is time-consuming and costly, and the product lacks the mechanical strength and wear-resistance for the intended end-uses, e.g. boxes, trays, mirror and brush backs, optical frames and the like.

Interference pigments, for example, titanium dioxide-coated mica in which the titanium dioxide layer is of interference film thickness, may be used in a plastic sheet for both pearl and color effects. However, a given interference pigment is limited by a single reflection color. A combination of different interference pigments incorporated side-by-side in a plastic sheet to increase the color range produces a discontinuous, blotchy effect which lacks the subtlety of the smooth color transitions which are characteristic of natural mother-of-pearl.

A true simulation of mother-of-pearl in a plastic sheet is accomplished in the present invention by combining a pearlescent plastic sheet containing metal oxide-coated mica with an intensely colored multilayer iridescent plastic film. The product has the appearance of natural mother-of-pearl and the mechanical properties necessary for successful use in objects such as compacts, mirror and brush backs, trays, pill boxes, etc.

SUMMARY OF THE INVENTION

The invention requires the combination of two plastic articles, a pearlescent sheet and an iridescent film. The pearlescent sheet comprises a transparent or translucent plastic pigmented with a metal oxide-coated mica, a preferred type being titanium dioxide-coated mica. These pigment particles are platelets, and sheets with either uniform or variegated pearl luster may be obtained depending on the orientation of the platelets.

The iridescent film is a multilayer structure comprising an optical core consisting of alternating very thin layers of two or more transparent thermoplastic polymers with different refractive indexes and a thicker "skin" layer on each of the two outer surfaces. The very thin core layers produce intense color by light interference; slight variations in layer thickness from one portion of the film to another create a variety of interference colors which reproduces the color ranges common in natural mother-of-pearl.

The pearlescent sheet and the iridescent film are laminated to produce the simulated mother-of-pearl product. The lamination is achieved with an adhesive, or by coextrusion, extrusion lamination, hot melt lamination, solvation, or heat sealing techniques. The invention, although directed to simulated mother-of-pearl, is also capable of producing plastic sheets with luster and iridescence even more intense and varied than seen in the natural product. These examples are novel and highly decorative.

DESCRIPTION OF THE INVENTION

The steps involved in making the mother-of-pearl sheet are: production of the pearlescent sheet; production of the iridescent film; lamination of the sheet and film to form a single sheet.

Pearlescent sheets can be prepared with a variety of nacreous pigments, such as coated mica pigments, natural pearl essence, basic lead carbonate, and bismuth oxychloride. Related appearances are obtained with metal flake pigments. The coated mica pigments are particularly suitable because they produce a great variety of optical effects and are especially resistant to fragmentation during the processing operations.

The pearlescent sheet may be produced by incorporating a metal oxide-coated mica pigment in a transparent or translucent polymer. An example is titanium dioxide-coated mica pigment, pearl-white in color, in cellulose acetate. The pigment is conveniently blended with cellulose acetate molding powder in a Banbury mixer. The pearly mass is granulated and fed to an extruder provided with a sheet-forming die to produce an extruded sheet with a uniform pearly luster. A 0.30 mm thick sheet achieves an attractive luster with a titanium dioxide-mica pigment content of about 0.2% to 20%, and preferably 0.5% to 10%.

A variegated luster can be produced by cutting a uniformly lustrous extruded sheet into pieces which are then fused into a block or cake. A thicker sheet for example, about 0.5 to about 3 mm, is suitable for this purpose. The pieces conveniently range from about 5 to about 40 mm in length and from about 2 mm to about 20 mm in width, but these ranges can be exceeded for special effects. The mold is filled randomly with the pieces which tend to lie more or less flat. Heat and pressure sufficient to form a solid block are applied, and the cake is sliced into sheets parallel to its top surface. The pigment platelets are oriented substantially parallel to the surface of the cake, but with sufficient variation in orientation from one point to another to yield a variegated lustrous pattern. The variation in orientation produces areas with bright luster adjacent to less bright regions, and the lustrous areas shift in position as the sheet is viewed from different angles.

Thermoplastic and thermosetting polymers may be used for the pearlescent sheet. Among the suitable thermoplastic polymers for use in the present invention, in addition to cellulose acetate, are other cellulosics such as cellulose propionate, cellulose acetate butyrate, and ethyl cellulose; polyolefins such as polyethylene, polypropylene and other copolymers; acrylics such as polymethyl methacrylate; polyvinyl chloride and its copolymers; polyesters such as polyethylene terephthalate, polybutylene terephthalate, and glycol-modified polyethylene terephthalate; polystyrene and the like. Unsaturated polyester resins are examples of suitable thermosetting polymers. The polymer should be transparent or translucent for effective display of the pearlescent luster.

Suitable nacreous pigments are mica coated with an oxide from the group including $TiO_2$, $ZrO_2$, $SnO_2$, $ZnO$, $Fe_2O_3$, $Cr_2O_3$ and $V_2O_5$, or with mixtures c two or more oxides. The oxides of Ti, Zr, Sn, and Zn are uncolored and may be used for the white pearl type of sheet which has been described. The oxides of Fe, Cr, and V are themselves colored and produce novel effects unseen in natural mother-of-pearl. Additional striking color effects, as will be described, are obtained by using interference pigments. Further novel effects are produced by combination pigments, in which the oxide-coated mica contains additional colorant. An example is titanium dioxide-coated mica overcoated with iron blue. If the reflection color of the mica pigment is itself blue, an especially intense blue luster is obtained. If the reflection color is any color but blue, a two-color effect is produced by the single pigment.

The production of iridescent film is described in Cooper et al., U.S. Pat. No. Re. 31,780. The optical component of the film consists of a plurality of generally parallel layers of two or more transparent thermoplastic resinous materials in which the contiguous adjacent layers are of diverse resinous materials whose index of refraction differs by at least about 0.03. The film contains at least 10 layers and more usually at least 35 layers and, preferably, at least about 70 layers.

The individual layers of the film are very thin, usually in the range of about 30 to 500 nm, preferably about 50-400 nm, which causes constructive interference in light waves reflected from the many interfaces. The reflected wavelength is proportional to the sum of the optical thicknesses of a pair of layers, and can be calculated for a two-component film from the equation $$\lambda_M = \frac{2}{M}(n_1 t_1 + n_2 t_2)$$

In this equation $\alpha$ is the reflected wavelength, M is the order of the reflection, t is the layer thickness, n is the refractive index, and 1 and 2 indicate the polymer of the first layer and the polymer of the second layer, respectively. The quantity nt is the optical thickness of a layer. For first order reflectance, i.e. where M is 1, visible light is reflected when the sum of optical thicknesses falls between about 200 and 350 nm. For first order reflections, reflectance is highest when the optical thicknesses of the layers are equal, although suitably high reflectances can be achieved when the ratio of optical thicknesses falls between 5:95 and 95:5.

The multilayer films can be made by a chill roll casting technique using a conventional single manifold flat die in combination with a feedblock which collects the melts from each of two or more extruders and arranges them into the desired pattern. Feedblocks are described in U.S. Pat. Nos. 3,565,985 and 3,773,882. The feedblocks can be used to form alternating layers of two components (e.g. ABAB . . . ), three components (e.g. ABCABC . . . ), or more. Usually, the outermost layer or layers on each side of the film are thicker than the multiple layers and do not contribute to the optical effect. This thicker skin may consist of one of the components which make up the optical core; may be of a different polymer or blend of polymers used to impart desirable mechanical, heat sealing, laminating, or other properties; and may consist of more than one layer. The two skins are generally of the same composition but may be different if desired.

If the resin (polymer) layers were completely uniform in thickness, the film would have a single reflection color at a given angle of illumination and observation. Very slight variations in width of the opening of the film-forming die from point to point across its length cause enough variation in layer thickness to produce different reflection colors from point to point in the iridescent film. Thus, the film has many colors. Each color also shifts with the angle of viewing, in accordance with the optical principles which govern iridescence.

The chill roll is ordinarily highly polished to produce a film with a very smooth surface and high gloss. For some purposes, a "frosted", more matte iridescent quality is preferred. This effect may be obtained by the use of a chill roll with minute surface irregularities which impart a microscopic roughness to the skin in contact with the roll.

The iridescent film is best described by a specific example, in which a 115-layer optical core consisted of glycol-modified polyethylene terephthalate (PETG) as the high index polymer resin and polymethyl methacrylate (PMMA) as the low index polymer resin. The optical thickness of the PETG layers ranged from about 17 to about 20 nm, that of the PMMA layers from about 7 to about 9 nm. The very smooth skin layers consisted of a mixture of equal parts of PMMA and an impact-modified polymethyl methacrylate. The overall film thickness was about 22 nm. The film reflected primarily green and red light when illuminated and viewed perpendicularly.

Other polymer resin pairs may be used for the optical core, the criterion being that they differ in refractive index by at least about 0.03 and preferably by at least 0.06 or more. A list of typical resins and their refractive indexes is given in Table I. Iridescent color is produced by pairs with the necessary refractive index separation.

TABLE I

| Polymer Name | Refractive Index |
|---|---|
| FEP (fluorinated ethylene-propylene copolymer) | 1.34 |
| Polytetrafluoroethylene | 1.35 |
| Polyvinylidenefluoride | 1.42 |
| Polychlorotrifluoroethylene | 1.42 |
| Polybutyl acrylate | 1.46 |
| Polyvinyl acetate | 1.47 |
| Ethyl cellulose | 1.47 |
| Polyformaldehyde | 1.48 |
| Polyisobutyl methacrylate | 1.48 |
| Polybutyl methacrylate | 1.48 |
| Polymethyl acrylate | 1.48 |
| Polypropyl methacrylate | 1.48 |
| Polyethyl methacrylate | 1.48 |
| Polymethyl methacrylate | 1.49 |
| Cellulose acetate | 1.49 |
| Cellulose propionate | 1.49 |
| Cellulose acetate-butyrate | 1.49 |
| Cellulose nitrate | 1.49 |
| Polyvinyl butaryl | 1.49 |
| Polypropylene | 1.49 |
| Low density polyethylene (branched) | 1.51 |
| Polyisobutylene | 1.51 |
| Natural rubber | 1.52 |
| Perbunan | 1.52 |
| Polybutadiene | 1.52 |
| Nylon (condensation copolymer of hexamethylene-diamine and adipic acid) | 1.53 |
| Polyvinyl chloracetate | 1.54 |
| Polyvinylchloride | 1.54 |
| Polyethylene (high density linear) | 1.54 |

TABLE I-continued

| Polymer Name | Refractive Index |
| --- | --- |
| A copolymer of 67 parts by weight methyl methacrylate and 33 parts by weight styrene | 1.54 |
| A copolymer of 85 parts by weight vinyl chloride and 15 parts by weight vinylidene chloride | 1.55 |
| Poly-α-methylstyrene | 1.56 |
| A copolymer of 60 parts by weight styrene and 40 parts by weight butadiene | 1.56 |
| Neoprene | 1.56 |
| A copolymer of 70 parts by weight styrene and 30 parts by weight acrylonitrile | 1.57 |
| Polyethylene terephthalate, glycol-modified | 1.57 |
| Polybutylene terephthalate | 1.57 |
| Polyethylene terephthalate | 1.57 |
| Polycarbonate | 1.59 |
| Polystyrene | 1.60 |
| A copolymer of 85 parts by weight vinylidene chloride and 15 parts by weight vinyl chloride | 1.61 |
| Polydichlorostyrene | 1.62 |

For the low refractive index component, polymethyl methacrylate (PMMA), polypropylene (PP), and ethylene vinyl acetate (EVA) are particularly useful. As the high index component, polystyrene (PS), polycarbonate (PC), polyethylene terephthalate (PET), modified PET, and polybutylene terephthalate (PBT) are especially suitable.

The polymer resin of the skin layer may be one of the core polymers or may be a different polymer chosen for its mechanical and other properties. Impact acrylic resin imparts improved winding characteristics, and provides a surface which is very receptive to adhesives as well as to printing inks and hot stamping foils. Where feasible, it is useful for the skin polymer to be the same as the pearlescent sheet polymer.

The above-described variegated pearly cellulose acetate sheet and iridescent film can be laminated together with for instance substantially clear and colorless polyurethane adhesive. The resulting sheet closely simulates the appearance of mother-of-pearl; it displays both the pearly luster and iridescence of the natural product when viewed with the iridescent film as the top surface.

The laminating procedure depends on the polymers of the pearlescent sheet and the skin of the iridescent film. When the two polymers are the same, and sometimes when they differ, they may be laminated directly by heat without an intervening adhesive. Thus, a pearlescent PVC sheet may be heat laminated to an iridescent film which has a PVC skin. Similarly, no adhesive is needed to bond a pearlescent methacrylate sheet to an iridescent film with a skin containing PMMA and impact-modified PMMA. In some cases, different polymers will bond well by heat lamination, e.g. acrylic to vinyl, EVA to PE. For cellulosics to polypropylene, on the other hand, adhesion lamination may be accomplished using substantially clear and colorless acrylic, polyurethane, thermosetting polyester, or thermoplastic polyester adhesives. Another technique is to heat laminate a dry bonding film of, for example, EVA copolymer between the pearl sheet and the iridescent film to effect the bond.

In order to further illustrate the present invention, several examples are set forth below, and it will be appreciated that these examples are not intended to limit the invention.

EXAMPLE 1

Iridescent film on white pearl-reflecting TiO$_2$-coated mica in polymethyl methacrylate (PMMA)

PMMA was pigmented by the addition of 2.5% TiO$_2$-coated mica (35% TiO$_2$, 65% mica, most platelets 5–25 μm in the longest direction) by blending in a Banbury mixer followed by granulation. The granulated pearlescent plastic was extruded to form a sheet 1.33 mm thick. The pearlescent sheet was cut into pieces ranging from 10–30 mm in length by 5–15 mm in width which were randomly stacked in a cake mold for fusing into one mass by pressing at about 245° F. (about 120° C.) and about 1000 psi (about 70 kg/cm$^2$). After cooling, the cake was sliced parallel to the top surface to form sheets 0.25 mm thick. The pearlescent sheets had a brilliant variegated pearlescent luster.

To make the iridescent film, clear polybutylene terephthalate (PBT) was fed to a feedblock from one extruder and clear PMMA from a second extruder to form a 23 μm (0.9 mil) film consisting of a total of 115 PBT and PMMA optical layers and two PMMA skin layers. Each skin layer was 20% of the total film. The PBT layers and the PMMA layers both ranged from about 0.11 to about 0.14 μm in optical thickness from point to point on the film. The film was brightly iridescent, and reflected blue, red, and green at perpendicular incidence.

The iridescent film was heat laminated to the pearlescent sheet to produce a brilliantly iridescent and pearlescent composite very similar in appearance to natural mother-of-pearl.

EXAMPLE 2

Iridescent film on white pearl-reflecting TiO$_2$-coated mica in cellulose acetate (CA).

The procedure of Example 1 was followed except that cellulose acetate (CA) was used for the pearlescent sheet in place of PMMA. The cake was pressed at about 200° F. (about 90° C.) and about 1000 psi (about 70 kg/cm$^2$). The optical core of the iridescent film consisted of PETG/PMMA. The PETG layers ranged in optical thickness from 0.17 to about 0.20 μm, and the PMMA layers from about 0.07 to 0.09 μm. The skin consisted of a layer of PETG adjacent to the optical core and a second outer layer which was a mixture of equal parts of PMMA and impact-modified acrylic resin, i.e. PMMA modified with elastomer; this outermost skin layer was applied by means of a third extruder. The iridescent sheet was prevailingly green and red when viewed at perpendicular incidence. The pearlescent sheet and iridescent film were adhesive-laminated with a poly(2-ethylhexyl acrylate) adhesive.

EXAMPLE 3

Iridescent film on gold-reflecting TiO$_2$-coated mica in polyvinyl chloride (PVC).

The procedure of Example 1 was followed except that 3.0% gold-reflecting TiO$_2$-coated mica (50% TiO$_2$, 50% mica) was used as the pigment and PVC as the polymer for the pearlescent sheet. The extruded sheet had a uniform golden luster, and was used directly without introducing the variegated pattern of Example 1.

The iridescent film was made with three extruders: polystyrene (PS) and ethylene vinyl acetate (EVA) for the optical core, and PVC for the skins. The iridescent film was heat-laminated to the golden PVC sheet, to produce a lustrous composite displaying a range of iridescent colors from greenish gold to reddish gold and copper.

EXAMPLE 4

Iridescent film on bronze-reflecting iron oxide-coated mica in CA

The procedure of Example 2 was followed, except that the pigment consisted of 1.5% bronze-reflecting iron oxide-coated mica (37% $Fe_2O_3$, 63% mica). A variegated pattern was introduced as in Example 2. The resulting lustrous bronze sheet was adhesive-laminated with polyurethane to the iridescent film of Example 2. The resulting product displayed a range of brilliant iridescent colors from greenish bronze to copper.

Examples 1 and 2 illustrate the production of simulated mother-of-pearl. Examples 3 and 4 exhibit novel and attractive iridescent colors not encountered in the natural product. Any of the composite sheets may be adhered to plastic, metal, wood, paperboard, or other surface to produce the indicated decorative effect. They are mechanically stable and can be fabricated and handled without impairment.

The visual effects can be modified by the use of metal oxide-coated mica pigments with different particle size range. Smaller particles, e.g. 5-15 μm, produce a softer pearl luster; larger particles, e.g. 10-40 μm, a more brilliant luster. Still larger particles can be used for a more metallic, glittery luster. Thus, the method may be utilized for a wide variety of effects.

The iridescent films which have been described achieve variations in reflection color by means of minor differences in layer thickness in the optical core. Very attractive films with less extended color play are obtained by reducing the thickness variation. Furthermore, although the invention has been described in terms of iridescent film laminated to pearlescent sheets, analogous effects are obtained with iridescent film laminated to pearlescent plastic particles of any desired shape.

What is claimed is:

1. An irridescent, lustrous composite consisting of a transparent or translucent thermoplsastic resin pigmented with 0.5-10% of a metal oxide-coated mica pigment, said substrate carrying on at least one surface thereof a transparent thermoplastic resinous laminate film of at least 70 very thin and generally parallel layers of transparent thermoplastic resinous materials, the contiguous layers differing in refractive index by at least about 0.06, and in which the layer at each external surface has a thickness which is greater than the thickness of any one of said very thin layers and at least 5% of the total thickness of the film.

2. The composite of claim 1, in which the pigment is titanium dioxide-coated mica.

3. The composite of claim 1, in which the pigment is ferric oxide-coated mica.

4. The composite of claim 1, in which a plurality of the layers of said film is a terephthalate polyester or copolyester resin having a refractive index of 1.55 to 1.61 or polystyrene.

5. The composite of claim 1, in which the substrate thermoplastic resin is polyvinyl chloride, the internal layers of the film are alternating layers of polystyrene and ethylene vinyl acetate and the film layer at each external surface is polyvinyl chloride.

6. The composite of claim 1, wherein the thermoplastic resin of the substrate and of the external surface of the film are heat laminatable without intervening adhesive.

7. The composite of claim 1, in which the substrate exhibits a variegated luster.

8. The composite of claim 4 in which the thermoplastic resin of the substrate and of the external surface of the film are the same.

9. The composite of claim 8, in which the substrate thermoplastic resin is polymethyl methacrylate and said film comprises alternate layers of polybutylene terephthalate and polymethyl methacrylate.

10. The composite of claim 4, in which the substrate thermoplastic resin is cellulose acetate, the internal layers of the film are alternating layers of glycol-modified polyethylene terephthalate and polymethyl methacrylate and the layer at the external surface contains a mixture of polymethyl methacrylate and acrylic resin.

* * * * *